United States Patent
Nemoto et al.

(10) Patent No.: US 11,237,057 B2
(45) Date of Patent: Feb. 1, 2022

(54) TEMPERATURE PROCESSING APPARATUS AND TEMPERATURE PROCESSING METHOD

(71) Applicants: Kabushiki Kaisha Toshiba, Minato-ku (JP); Toshiba Energy Systems & Solutions Corporation, Kawasaki (JP)

(72) Inventors: Akira Nemoto, Ota (JP); Shota Tsuda, Yokohama (JP); Masanori Murakami, Fujisawa (JP)

(73) Assignees: Kabushiki Kaisha Toshiba, Minato-ku (JP); Toshiba Energy Systems & Solutions Corporation, Kawasaki (JP)

(*) Notice: Subject to any disclaimer, the term of this patent is extended or adjusted under 35 U.S.C. 154(b) by 246 days.

(21) Appl. No.: 16/693,417

(22) Filed: Nov. 25, 2019

(65) Prior Publication Data

US 2020/0166409 A1    May 28, 2020

(30) Foreign Application Priority Data

Nov. 26, 2018 (JP) .............................. JP2018-220359

(51) Int. Cl.
  *G01J 5/02* (2006.01)
  *H04N 5/33* (2006.01)
  *G01J 5/00* (2006.01)

(52) U.S. Cl.
  CPC ............... *G01J 5/025* (2013.01); *H04N 5/33* (2013.01); *G01J 2005/0077* (2013.01); *G01J 2005/0081* (2013.01)

(58) Field of Classification Search
  CPC ............... G01J 5/025; G01J 2005/0081; G01J 2005/0077; H04N 5/33; G06T 11/206; G06T 19/00
  See application file for complete search history.

(56) References Cited

U.S. PATENT DOCUMENTS

| 2018/0053055 A1 | 2/2018 | Finding et al. |
| 2019/0086903 A1 | 3/2019 | Ochiai |
| 2019/0088022 A1 | 3/2019 | Ochiai |
| 2019/0129675 A1 | 5/2019 | Ochiai |

FOREIGN PATENT DOCUMENTS

| JP | WO2017/169282 | * 5/2017 | ............. G05B 23/02 |
| WO | WO 2017/169276 A1 | 10/2017 | |
| WO | WO 2017/169280 A1 | 10/2017 | |
| WO | WO 2017/169282 A1 | 10/2017 | |

* cited by examiner

*Primary Examiner* — David P Porta
*Assistant Examiner* — Meenakshi S Sahu
(74) *Attorney, Agent, or Firm* — Oblon, McClelland, Maier & Neustadt, L.L.P.

(57) ABSTRACT

A temperature processing apparatus according to the present embodiment includes a storage device, and a processor. The processor includes an alignment module, an acquisition module, a processing module, a determination module, and a display processing module. The determination module configured to determine whether the temperature data fits in a first state. The display processing module is configured to display a temperature-distribution image of the temperature data fitting the first state on a display module by mapping the temperature-distribution image of the temperature data fitting the first state on at least either the real-space image or an image of the three-dimensional model, when the determination module determines that the temperature data fits the first state.

14 Claims, 12 Drawing Sheets

| XW\YW | 100 | 200 | 300 | 400 | 500 | 600 |
|---|---|---|---|---|---|---|
| 100 | 650 | 600 | 650 | NULL | NULL | NULL |
| 200 | 680 | 700 | 700 | 690 | NULL | NULL |
| 300 | 800 | 900 | 850 | 800 | 720 | NULL |
| 400 | NULL | 850 | 800 | 600 | 500 | 800 |
| 500 | NULL | NULL | 890 | NULL | NULL | NULL |
| 600 | NULL | NULL | NULL | NULL | NULL | NULL |

| XW \ YW | 100 | 200 | 300 | 400 | 500 | 600 |
|---|---|---|---|---|---|---|
| 100 | NULL | NULL | 650 | NULL | NULL | NULL |
| 200 | 680 | 700 | 700 | 690 | 800 | NULL |
| 300 | 800 | 900 | 850 | 800 | 720 | NULL |
| 400 | 850 | 850 | 800 | 600 | 500 | 800 |
| 500 | NULL | NULL | 890 | 600 | 800 | NULL |
| 600 | NULL | NULL | NULL | 760 | 730 | NULL |

| DISPLAY SCREEN | STATE | OPERATION |
|---|---|---|
| REAL-SPACE IMAGE | HIDDEN | OFF |
| ABNORMAL REGION | DISPLAYED | ON |
| TEMPERATURE-DISTRIBUTION IMAGE | HIDDEN | OFF |
| MODEL SHAPE | DISPLAYED | ON |
| INTERNAL MODEL OF MODEL SHAPE | DISPLAYED | ON |
| EDGE OF MODEL SHAPE | HIDDEN | OFF |

FIG. 14

| ATTRIBUTE INFORMATION | STATE | OPERATION |
|---|---|---|
| FIRST INTERNAL STRUCTURE | DISPLAYED | ON |
| SECOND INTERNAL STRUCTURE | DISPLAYED | OFF |

FIG. 15

| ATTRIBUTE INFORMATION | STATE | OPERATION |
|---|---|---|
| FIRST OIL COOLER | DISPLAYED | ON |
| SECOND OIL COOLER | DISPLAYED | ON |
| MAIN PIPE | DISPLAYED | ON |
| CONDENSER | HIDDEN | OFF |
| FLASHER | HIDDEN | OFF |

TEMPERATURE PROCESSING APPARATUS AND TEMPERATURE PROCESSING METHOD

CROSS-REFERENCE TO RELATED APPLICATIONS

This application is based upon and claims the benefit of priority from Japanese Patent Application No. 2018-220359, filed on Nov. 26, 2018; the entire contents of which are incorporated herein by reference.

FIELD

Embodiments of the present invention relate to a temperature processing apparatus and a temperature processing method.

BACKGROUND

In order to monitor a process state during a plant operation, a thermocouple and a measuring device for measuring a flow rate, a pressure, or the like are attached to a measuring object. In this case, it is possible to detect a sign of an abnormality in a limited measurement range including the position to which the measuring device is attached. However, when a partial abnormality such as leakage of a fluid occurs outside the measurement range, it is difficult to detect the sign of the abnormality.

Therefore, an abnormal site is detected and identified in a wide range by observation using a temperature-distribution image captured by infrared thermography. In this case, it is determined by a person whether temperature information obtained from the temperature-distribution image is normal or abnormal, which requires sufficient experience and knowledge. In contrast to such determination, objective determination based on statistical data is required. In order to store the statistical data, it is necessary to associate temperature data included in a temperature-distribution image with coordinates that correspond to a surface of a real object to be observed. Pattern matching is known as one of associating techniques. In pattern matching, when an image-capturing position in infrared thermography is different, accuracy of association between the temperature-distribution image and the coordinates of the real object is reduced.

BRIEF DESCRIPTION OF THE DRAWINGS

FIG. 14 is a diagram illustrating an operation mode example of the display processing module;

FIG. 15 is a diagram illustrating another operation mode example of the display processing module;

DETAILED DESCRIPTION

Figure 1:
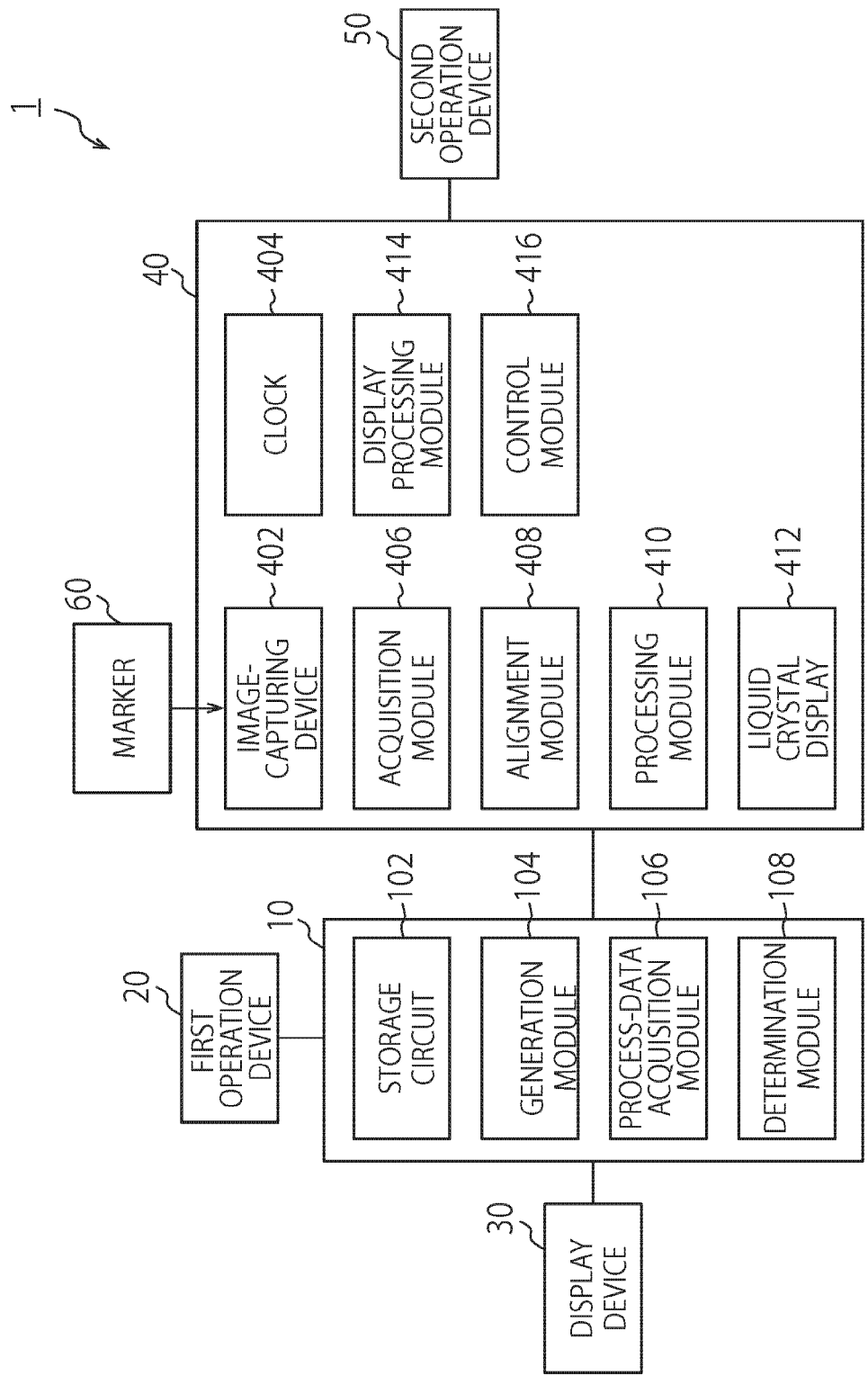
FIG. 1 is a block diagram illustrating a configuration of a temperature processing apparatus according to an embodiment of the present invention.

A temperature processing apparatus according to the present embodiment includes a storage device, a drive circuit, and a processor. The storage device is configured to store therein a temperature processing program. The processor is configured to perform temperature processing in accordance with the temperature processing program. The processor includes an alignment module, an acquisition module, a processing module, a determination module, and a display processing module. The alignment module is configured to align is arranged and a three-dimensional model space in which a three-dimensional model of a real object is captured by the image-capturing module. The acquisition module is configured to acquire temperature-distribution images captured by the image-capturing module from a plurality of different positions and a real-space image. The processing module is configured to associate temperature data in the temperature-distribution images with coordinates corresponding to a surface of the three-dimensional model, wherein the temperature data associated with the coordinates is stored in the storage device. The determination module configured to determine whether the temperature data fits in a first state. The display processing module is configured to display a temperature-distribution image of the temperature data fitting the first state on a display module by mapping the temperature-distribution image of the temperature data fitting the first state on at least either the real-space image or an image of the three-dimensional model, when the determination module determines that the temperature data fits the first state.

The temperature processing apparatus and a temperature processing method according to embodiments of the present invention will now be explained in detail with reference to the accompanying drawings. The embodiments described below are only examples of the embodiments of the present invention and the present invention is not limited to the embodiments. In the drawings referred in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

FIG. 1 is a block diagram illustrating a configuration of a temperature processing apparatus 1 according to the present embodiment. As illustrated in FIG. 1, the temperature processing apparatus 1 according to the present embodiment associates temperature-distribution data in a real space with coordinates that correspond to a surface of a real object. The temperature processing apparatus 1 is configured to include a data processing device 10, a first operation device 20, a display device 30, a head-mounted video device 40, a second operation device 50, and a marker 60.

The data processing device 10 generates a three-dimensional model corresponding to a real object. The three-dimensional model according to the present embodiment is generated in a three-dimensional model space. The coordinate of the three-dimensional model space corresponds to a world coordinate of the real space. A detailed configuration of the data processing device 10 will be described later.

The first operation device 20 inputs information required for operating the data processing device 10. The first operation device 20 is configured by, for example, a keyboard, a mouse, and a pointing device.

The display device 30 is configured by, for example, a liquid crystal display and a CRT (Cathode Ray Tube) display. The display device 30 displays various types of information generated by the data processing device 10, an image generated by the head-mounted video device 40, and the like. For example, the display device 30 displays at least a part of a temperature-distribution image together with at least either a real-space image or a three-dimensional model image.

The head-mounted video device 40 is, for example, a wearable computer and is a goggle-type device to be mounted on the head of an operator. The head-mounted video device 40 captures a temperature-distribution image of the real object arranged in the real space and the real-space image, and makes the images correspond to the three-dimensional model arranged in the coordinate of the three-dimensional model space. The coordinate of the three-dimensional model space corresponds to the world coordinate. A detailed configuration of the head-mounted video device 40 will be described later. A number or a set of numbers given to represent the position of a point on the real object or the three-dimensional model is referred to as "coordinate". Three-dimensional coordinates are used in the present embodiment. However, coordinates to be used are not limited thereto, and may be one-dimensional coordinates, for example.

The second operation device 50 inputs information required for operating the head-mounted video device 40. The head-mounted video device 40 is configured by, for example, a keyboard, a mouse, and a pointing device.

A plurality of the markers 60 each have a two-dimensional geometric pattern and are used for making the coordinate of the real space and a coordinate of an image-capturing device 402 of the head-mounted video device 40 correspond to each other. The positions at which the markers 60 are arranged correspond to predetermined coordinates in the coordinate of the three-dimensional model space. The position and the posture of the head-mounted video device 40 in the world coordinate are recognized based on captured image data of the markers 60. Accordingly, it is possible to make the coordinate of the head-mounted video device 40 correspond to the coordinate of the three-dimensional model space.

The detailed configuration of the data processing device 10 is described. The data processing device 10 is configured to include a processor, and includes a storage circuit 102, a generation module 104, a process-data acquisition module 106, and a determination module 108. The processor implements functions of the generation module 104, the process-data acquisition module 106, and the determination module 108 by executing a program stored in the storage circuit 102. The term "processor" used herein means a circuit such as a CPU (Central Processing Unit) and a GPU (Graphics Processing Unit).

The storage circuit 102 is realized by, for example, a semiconductor memory device such as a RAM (Random Access Memory) and a flash memory, a hard disk, or the like. The storage circuit 102 stores therein programs to be executed by the data processing device 10 and pieces of data for various controls.

The storage circuit 102 stores therein three-dimensional information that represents a three-dimensional structure of a real object. The three-dimensional information includes information describing a position and an orientation in the world coordinate as arrangement information in the real world. For example, the real object is a device, a pipe, or the like within a plant. The storage circuit 102 stores therein information on a design member such as a device or a pipe within a plant, for example, information on a three-dimensional CAD model, and information indicating an arrangement position and an orientation in the world coordinate. The storage circuit 102 also stores therein attribute information of the real object.

Further, the storage circuit 102 stores therein temperature data associated with coordinates that correspond to the surface of the real object. More specifically, in a case where the real object is a member that configures a plant, the storage circuit 102 stores therein temperature data associated with the coordinates corresponding to the surface of the real object to be also associated with at least either process data that represents an operation state of the plant or a time.

Figure 2:
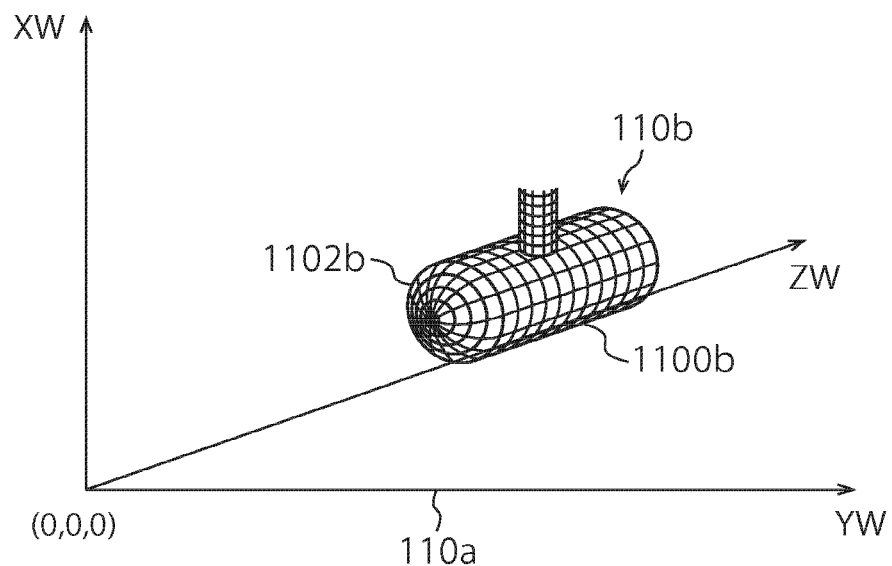
FIG. 2 is a diagram illustrating an example of a three-dimensional model that corresponds to a real object.

FIG. 2 is a diagram illustrating an example of a three-dimensional model 110b that corresponds to a real object, generated in a three-dimensional model space. Here, the real object is a flasher. A coordinate 110a of the three-dimensional model space corresponds to a world coordinate of a real space. The flasher is arranged in a power plant and is used for reducing the pressure of steam.

As illustrated in FIG. 2, the generation module 104 generates the three-dimensional model 110b that corresponds to the real object in the three-dimensional model space based on three-dimensional information on the real object stored in the storage circuit 102. The three-dimensional model 110b has a shape and a size that are equivalent to those of the real object arranged in the world coordinate of the real space. Further, the three-dimensional model 110b has a position and a posture that are equivalent to those of the real object.

The process-data acquisition module 106 acquires various types of process data from a monitoring sensor arranged in a device, a pipe, or the like within a plant. Examples of the process data include an output value such as a power generation amount, an air temperature, a water temperature, a pressure, a steam temperature, a steam pressure, and a condensate flow rate. The process data acquired by the process-data acquisition module 106 is stored in the storage circuit 102 in time series.

The determination module 108 determines whether a temperature associated with a coordinate corresponding to the surface of the real object is abnormal. The determination module 108 also determines whether an operation state of the real object is abnormal in accordance with the process data that represents the operation state of the real object. The abnormal state according to the present embodiment corresponds to a first state. Details of the determination module 108 will be described later.

The detailed configuration of the head-mounted video device 40 is described. As illustrated in FIG. 1, the head-mounted video device 40 is configured to include a processor, and includes the image-capturing device 402, a clock 404, an acquisition module 406, an alignment module 408, a processing module 410, a liquid crystal display 412, a display processing module 414, and a control module 416. The processor implements functions of the image-capturing device 402, the clock 404, the acquisition module 406, the alignment module 408, the processing module 410, the liquid crystal display 412, the display processing module 414, and the control module 416 by executing a program stored in the storage circuit 102.

Figure 3:
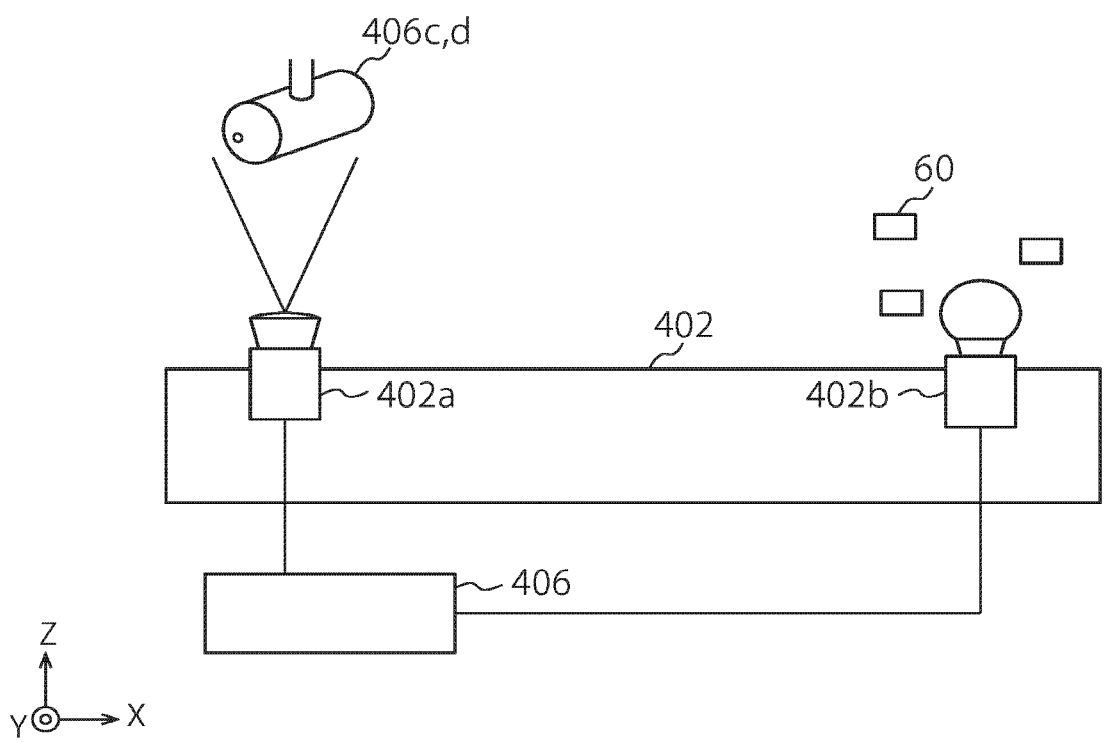
FIG. 3 is a diagram illustrating a configuration example of an image-capturing device.

FIG. 3 is a diagram illustrating a configuration example of the image-capturing device 402. As illustrated in FIG. 3, the image-capturing device 402 includes a temperature-distribution imaging camera 402a and a hemispherical imaging camera 402b. The temperature-distribution imaging camera 402a is, for example, an infrared thermography device and captures a temperature-distribution image 406c. That is, each pixel value in a temperature-distribution image corresponds to temperature data. The optical axis of the temperature-distribution imaging camera 402a is assumed to be the Z-axis. An image-capturing plane of an image sensor of the temperature-distribution imaging camera 402a is arranged to be parallel to an X-Y plane. That is, in the coordinate of the image-capturing device 402, the optical axis of the temperature-distribution imaging camera 402a is the Z-axis and a plane parallel to the image-capturing plane of the image sensor is the X-Y plane. Further, the origin of the coordinate of the image-capturing device 402 is an intersection of the image-capturing plane of the image sensor and the optical-axis center of the temperature-distribution imaging camera 402a.

The temperature-distribution imaging camera 402a according to the present embodiment is a general infrared thermography device and can capture the temperature-distribution image 406c that is an infrared image, a real-space image 406d that is a visible image, and a composite image of the temperature-distribution image 406c and the real-space image 406d. While the temperature-distribution imaging camera 402a according to the present embodiment is an infrared thermography device, it is not limited thereto. The temperature-distribution imaging camera 402a may be a camera in another form as long as it can capture the temperature-distribution image 406c and the real-space image 406d, and may be a combination of thermal imaging and a digital camera, for example. The number of the temperature-distribution imaging cameras 402a may be plural.

The hemispheric imaging camera 402b is an infrared thermography device that can capture an image of a hemisphere. For example, the hemispheric imaging camera 402b captures a temperature-distribution image at normal times. Accordingly, it is possible to capture a temperature-distribution image for more monitoring ranges. Meanwhile, the hemispheric imaging camera 402b captures a visible image at a predetermined cycle. Accordingly, it is possible to use the hemispheric imaging camera 402b as a camera for capturing an image of the marker 60. For example, in a case where a supervisor performs monitoring while patrolling inside a plant, it is possible to capture an image of the marker 60 with the hemispheric imaging camera 402b without making an image-capturing direction of the hemispheric imaging camera 402b face the marker 60. Therefore, the supervisor can focus on monitoring the inside of the plant more.

The clock 404 in FIG. 1 is, for example, a general clock circuit and outputs a time. The clock 404 associates a time at which an image is captured by the image-capturing device 402 with image data.

The acquisition module 406 acquires a temperature-distribution image in a real space captured by the image-capturing device 402. The acquisition module 406 also acquires a real-space image captured by the image-capturing device 402 and a composite image of the temperature-distribution image and the real-space image.

Figure 4:
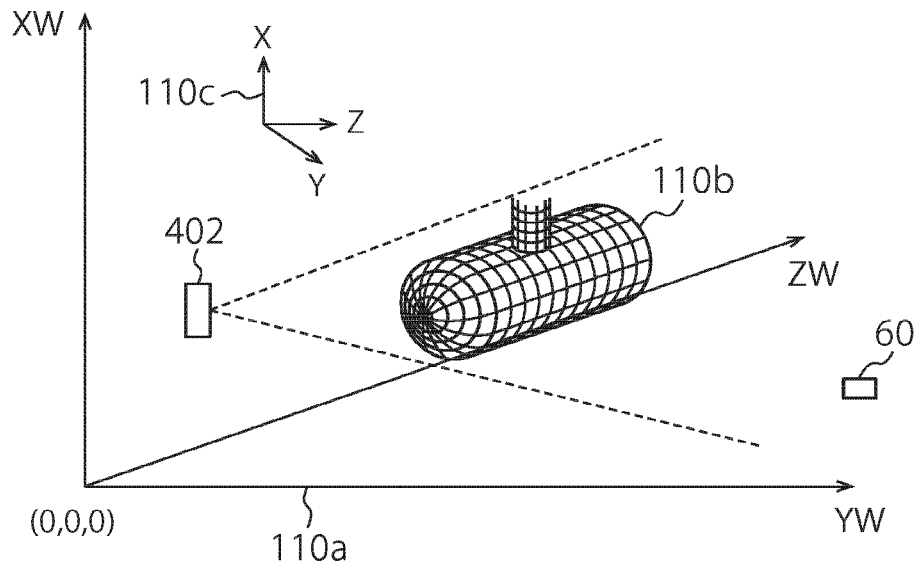
FIG. 4 is a conceptual diagram illustrating a state of alignment between a coordinate of a three-dimensional model space and a coordinate of the image-capturing device.

FIG. 4 is a conceptual diagram illustrating a state of alignment between the coordinate 110a of the three-dimensional model space in which the three-dimensional model 110b is arranged and a coordinate 110c of the image-capturing device 402.

Figure 5:
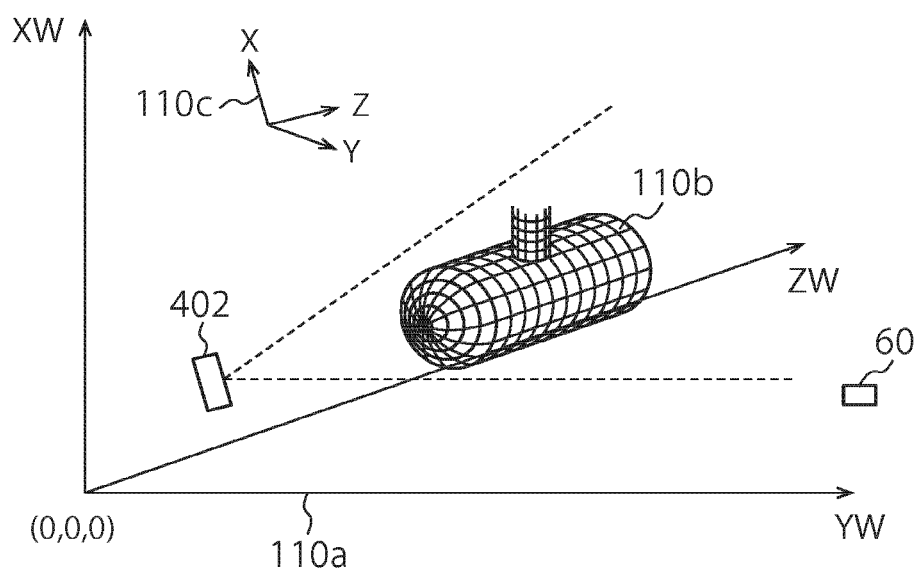
FIG. 5 is a conceptual diagram illustrating a case where the image-capturing device is arranged at a different position from that in FIG. 4.

FIG. 5 is a conceptual diagram illustrating a state of alignment between the coordinate 110a and the coordinate 110c in a case where the image-capturing device 402 is arranged at a different position from that in FIG. 4.

As illustrated in FIGS. 4 and 5, the alignment module 408 aligns the coordinate 110a of the three-dimensional model space, that is, a world coordinate, and the coordinate 110c of the image-capturing device 402 with each other. The three-dimensional model 110b which corresponds to a real object observed from the image-capturing device 402 is arranged in the three-dimensional model space.

More specifically, by using information on the marker 60 captured by the image-capturing device 402, the alignment module 408 recognizes the position and the posture of the image-capturing device 402 and aligns the coordinate 110a of the three-dimensional model space and the coordinate 110c with each other. Alignment according to the present embodiment means to obtain a correspondence between a coordinate in the coordinate 110a and a coordinate in the coordinate 110c. For example, the alignment according to the present embodiment means to obtain a coordinate in the coordinate 110c which corresponds to the coordinate origin in the coordinate 110a, a deviation angle between the X-axis and the XW-axis, a deviation angle between the Y-axis and the YW-axis, and a deviation angle between the Z-axis and the ZW-axis.

More specifically, the marker 60 according to the present embodiment is arranged at a position in the real space corresponding to a predetermined coordinate in the coordinate 110a of the three-dimensional model space. Therefore, the position and the posture of the head-mounted video device 40 are recognized based on captured image data of the marker 60. That is, the coordinate in the coordinate 110c which corresponds to the coordinate origin in the coordinate 110a, the deviation angle between the X-axis and the XW-axis, the deviation angle between the Y-axis and the YW-axis, and the deviation angle between the Z-axis and the ZW-axis are calculated based on this recognition of the position and the posture. In calculation for aligning the coordinate 110a of the three-dimensional model space, that is, the world coordinate, and the coordinate 110c of the image-capturing device 402 with each other, it is possible to use a general calculation method that uses information on a marker.

Further, the alignment module 408 calculates a three-dimensional coordinate of a natural feature point extracted from an image in the real space by SfM (Structure from Motion), for example, based on image data captured by the image-capturing device 402, and stores the three-dimensional coordinate as landmark data therein. The alignment module 408 then estimates the position and the posture of the head-mounted video device 40 based on a correspondence between the landmark data and a natural feature point obtained from the image data captured by the image-capturing device 402. In this manner, also in a case where the image of the marker 60 is not captured, it is possible to estimate the position and the posture of the head-mounted video device 40 in the coordinate of the real space. A method of estimating the position and the posture is not limited to this method. The position and the posture of the head-mounted video device 40 may be estimated by performing position measurement using a GPS and orientation measurement based on geomagnetism using a beacon, for example.

The processing module 410 performs a process of associating temperature data in a temperature-distribution image with coordinates that correspond to a surface of a real object based on the alignment by the alignment module 408. That is, the processing module 410 makes the temperature-distribution image captured by the image-capturing device 402 correspond to three-dimensional coordinates on a surface of the three-dimensional model based on the alignment by the alignment module 408, thereby associating the temperature data with three-dimensional coordinates on the surface of the real object corresponding to the three-dimensional model.

Figures 6, 7:
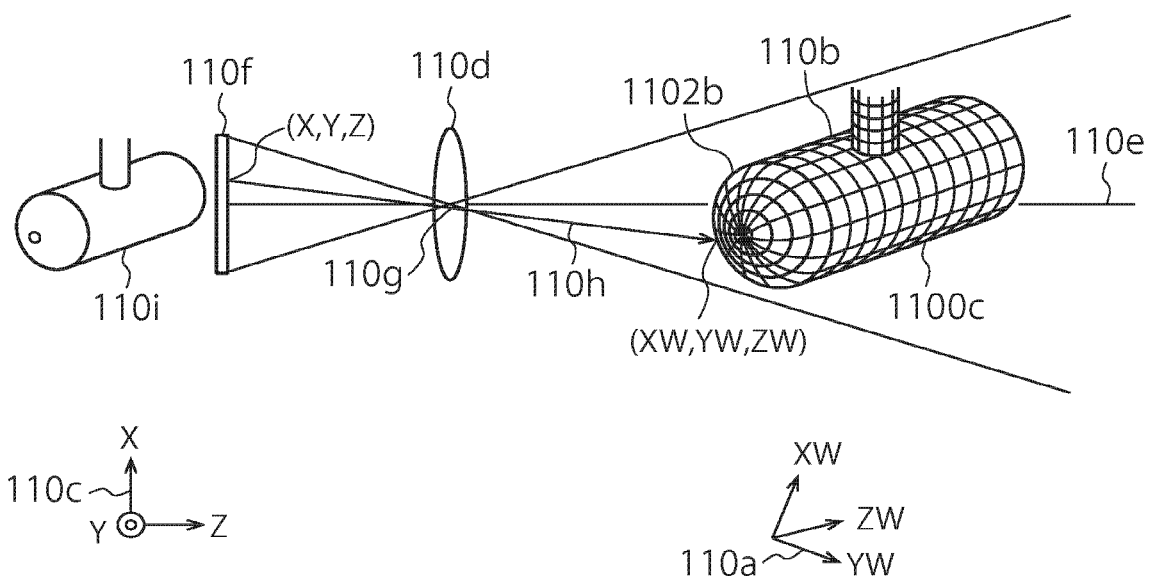
FIG. 6 is a conceptual diagram in which temperature data is associated with coordinates that correspond to a surface of a real object.
FIG. 7 is a diagram schematically illustrating temperature data associated with three-dimensional coordinates in a mesh model, as two-dimensional data.

FIG. 6 is a conceptual diagram for explaining a process of associating temperature data in a temperature-distribution image 110i with coordinates that correspond to a surface of a real object. As illustrated in FIG. 6, XW, YW, and ZW represent the coordinate 110a of the three-dimensional model, that is, a world coordinate. Meanwhile, X, Y, and Z represent the coordinate 110c of the image-capturing device 402. Further, three-dimensional coordinates on a left surface of the three-dimensional model 110b are represented by a mesh model 1102b, and three-dimensional coordinates on a side surface are represented by a mesh model 1102c. The coordinates represented by these mesh models 1102b and 1102c correspond to coordinates on the surface of the real object.

The coordinate origin of the coordinate 110c according to the present embodiment is an intersection between an image sensor 110f in the temperature-distribution imaging camera 402a and an optical-axis center 110e of a lens 110d, as described above. The origin position of the coordinate 110c is arranged at a coordinate (X1, Y1, Z1) in the world coordinate based on information obtained by the alignment by the alignment module 408. Further, the Z-axis direction represents an optical-axis direction of the temperature-distribution imaging camera 402a obtained by the alignment by the alignment module 408. Furthermore, the XY-plane is perpendicular to the Z-axis and is parallel to the image sensor 110f.

As can be understood from the above explanations, a coordinate (X, Y, Z) on the image sensor 110f corresponds to a coordinate (XW, YW, ZW) at which a perspective line 110h passing through a lens center 110g of the lens 110d crosses the three-dimensional model 110b because of general characteristics of an optical system of the temperature-distribution imaging camera 402a. That is, the coordinate (X, Y, Z) in the temperature-distribution image 110i on the image sensor 110f can be associated with the coordinate (XW, YW, ZW) at which the perspective line 110h passing through the lens center 110g crosses the three-dimensional model 110b. In this manner, the processing module 410 performs a process of associating temperature data in a temperature-distribution image with coordinates that correspond to a surface of a real object based on the alignment by the alignment module 408.

FIG. 7 is a diagram schematically illustrating a part of temperature data associated with three-dimensional coordinates in the mesh model 1102c, as two-dimensional data. The vertical axis represents a XW coordinate value, and the horizontal axis represents a YW coordinate value. A ZW coordinate value is omitted for simplifying the descriptions. Further, the temperature data associated with the three-dimensional coordinates in the mesh model 1102c is limited to temperature data within a temperature-distribution image that can be captured by the temperature-distribution imaging camera 402a.

Figures 8, 9:
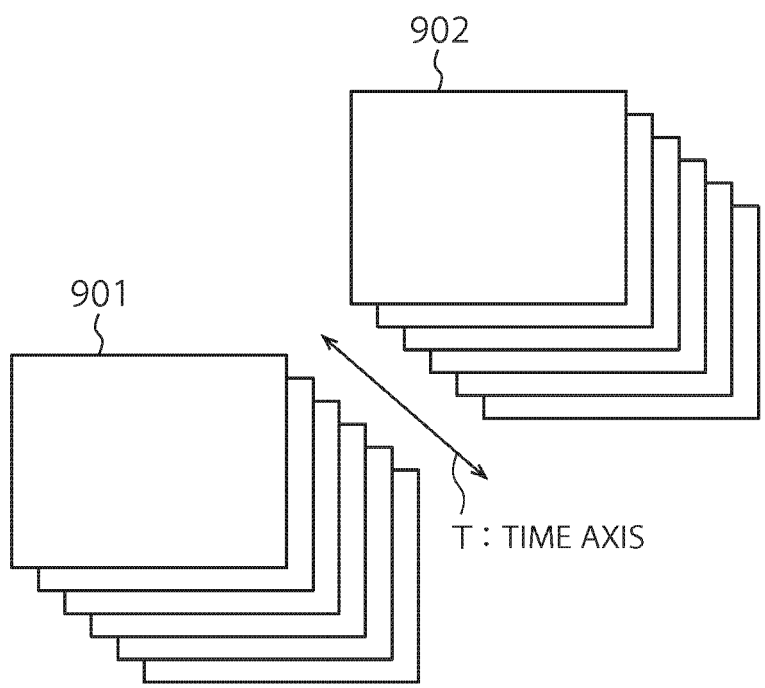
FIG. 8 is a diagram schematically illustrating temperature data captured at a different image-capturing position from that in FIG. 7, as two-dimensional data.
FIG. 9 is a diagram illustrating temperature data associated with coordinates and process data.

FIG. 8 is a similar diagram to FIG. 7 and schematically illustrates a part of temperature data captured at a different image-capturing position from that of FIG. 7, as two-dimensional data. As illustrated in FIGS. 7 and 8, temperature data associated with a three-dimensional coordinate in the mesh model 1102c is different depending on the image-capturing position. Further, the temperature data associated with three-dimensional coordinates in the mesh model 1102c is limited to temperature data within a temperature-distribution image that can be captured by the temperature-distribution imaging camera 402a. Therefore, when the image-capturing position of the temperature-distribution imaging camera 402a is different, a coordinate at which NULL is stored is also different. Meanwhile, temperature data within a temperature-distribution image of a real object that can be captured by the temperature-distribution imaging camera 402a is stored at a corresponding coordinate even when image capturing is performed from a different position. The temperature data associated with the coordinates is stored in the storage circuit 102.

In other words, temperature data in temperature-distribution images respectively captured from different positions can be associated with a common coordinate that corresponds to a surface of a real object via the three-dimensional model 110b. In this manner, it is possible to associate data captured at different timings and from different positions with a common coordinate that corresponds to the surface of the real object via the three-dimensional model 110b. Therefore, it is also possible to manage temperature-distribution images captured from different image-capturing positions or temperature-distribution images captured by a plurality of the image-capturing devices 402 that are mutually different as common data.

FIG. 9 is a conceptual diagram of temperature data 901 associated with coordinates that correspond to a surface of a real object and process data 902. The storage circuit 102 stores therein the temperature data 901 associated with the coordinates that correspond to the surface of the real object in time series along a time axis T. The storage circuit 102 also stores therein the process data 902 acquired by the process-data acquisition module 106 to be associated with the temperature data 901 in time series.

Referring back to FIG. 1, the liquid crystal display 412 is, for example, an optical see-through-type liquid crystal display. The liquid crystal display 412 allows a supervisor to monitor a device with the naked eye at normal times. Meanwhile, the liquid crystal display 412 is configured to enable observation of an image displayed thereon when image data is input. The liquid crystal display 412 according to the present embodiment corresponds to a display module.

The display processing module 414 displays at least a part of the temperature-distribution image 406c captured by the image-capturing device 402 (FIG. 3) on the liquid crystal display 412 together with at least one of the real-space image 406d (FIG. 3) and an image of the three-dimensional model 110b (FIG. 2) based on alignment by the alignment module 408. Further, when the determination module 108 determines that a temperature is an abnormal state, the display processing module 414 may display at least a part of the temperature-distribution image 406c captured by the image-capturing device 402 (FIG. 3) on the liquid crystal display 412 together with at least one of the real-space image 406d (FIG. 3) and the image of the three-dimensional model 110b (FIG. 2). In this case, a temperature image representing a region where a temperature abnormality has occurred is displayed, for example. The display processing module 414 may display these processing images also on the display device 30. Details of the display processing module 414 will be described later.

The control module 416 controls the overall temperature processing apparatus 1.

Details of a process performed by the determination module 108 are described. The determination module 108 has a function of comparing the temperature-distribution image 406c captured by the image-capturing device 402 (FIG. 3) with data stored in the storage circuit 102 and determining whether there is an abnormality.

Figure 10:
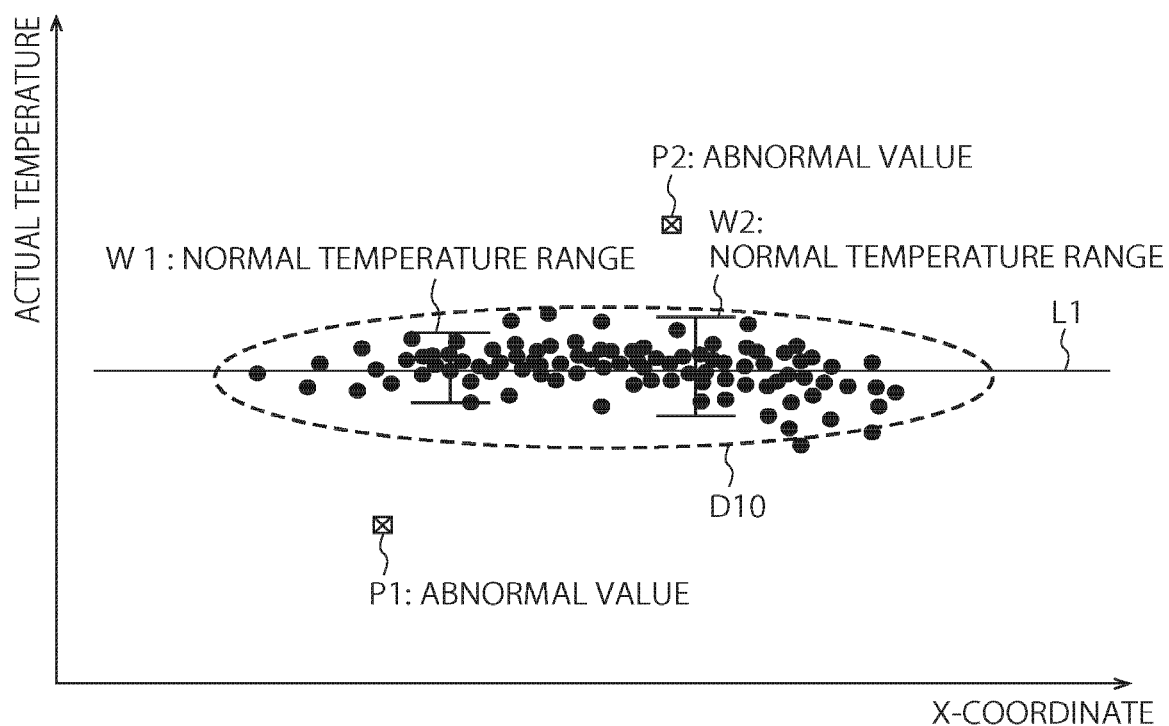
FIG. 10 is a diagram illustrating temperature-distribution data on one axis on a surface of a real object.

FIG. 10 is a diagram illustrating temperature-distribution data D10 on one axis on a surface of a real object. The vertical axis represents a temperature and the horizontal axis represents an X-coordinate. The temperature-distribution data D10 is data associated with coordinates on the surface of the real object and is stored in the storage circuit 102. A line L1 represents an average value of the temperature-distribution data D10. Temperatures P1 and P2 are pieces of data each representing an abnormal value in temperature data captured by and sent from the image-capturing device 402. The temperature-distribution data D10 is data in which pieces of temperature data in temperature-distribution images respectively captured at different image-capturing positions are associated.

As illustrated in FIG. 10, the determination module 108 calculates a normal-value range of a temperature for each coordinate and determines a temperature out of the range of the normal value as being abnormal. More specifically, a variance a of temperature values for each coordinate is calculated, and it is assumed that a range within 2σ is normal-value ranges W1 and W2. The temperatures P1 and P2 are determined as being abnormal because they are out of the normal-value ranges W1 and W2, respectively. As calculation of the variance a of temperature values, a variance of temperatures associated with each coordinate may be calculated. Alternatively, for each coordinate, a variance of temperatures associated with each of coordinates that correspond to points within a predetermined range from a point of the real object corresponding to that coordinate may be calculated.

The determination module 108 outputs information on a coordinate for which a temperature is determined as being abnormal to the display processing module 414. Accordingly, based on the coordinate for which a temperature is determined as being abnormal by the determination module 108, the display processing module 414 displays a temperature image of a region where the temperature abnormality has occurred in the temperature-distribution image 406c captured by the image-capturing device 402 (FIG. 3) on the liquid crystal display 412 together with at least either the real-space image 406d (FIG. 3) or an image of the three-dimensional model 110b (FIG. 2).

Figure 11:
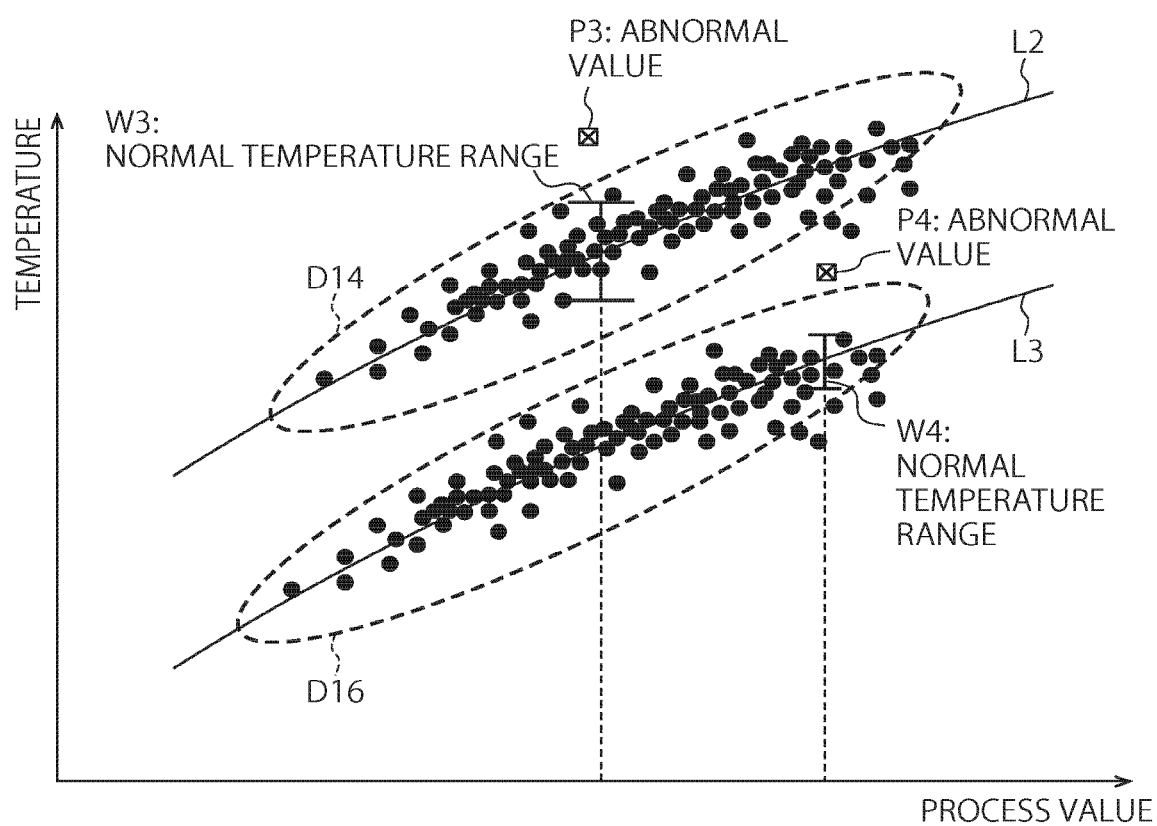
FIG. 11 is an explanatory diagram of an example of a determination process to which information on process data is added.

FIG. 11 is a diagram for explaining an example of a determination process to which information on process data is added. The vertical axis represents a temperature and the horizontal axis represents a process value. Temperature distribution data D14 represents a distribution of temperature data acquired with regard to a parameter A and represents a distribution of temperature data associated with one coordinate on a surface of a real object. A line L2 represents an average value of the temperature-distribution data D14 for each process value.

Temperature distribution data D16 represents a distribution of temperature data acquired with regard to a parameter B and represents a distribution of temperature data associated with one coordinate on the surface of the real object. A line L3 represents an average value of the temperature-distribution data D16 for each process value. Each of the temperature-distribution data D14 or D16 is data in which pieces of temperature data in temperature-distribution images captured at different image-capturing positions are associated.

The determination module 108 calculates a normal-value range of a temperature for each process value with regard to the same parameter, and determines a temperature out of the range of the normal value as being abnormal. More specifically, the determination module 108 calculates a variance a of temperature values for each process value and assumes a range within 2σ to be normal-value ranges W3 and W4. The determination module 108 determines the temperatures P3 and P4 as being abnormal because they are out of the normal-value ranges W3 and W4, respectively. As calculation of the variance a of temperature values, a variance of temperatures associated with each coordinate may be calculated. Alternatively, for each coordinate, a variance of temperatures associated with each of coordinates that correspond to points within a predetermined range from a point of the real object corresponding to that coordinate may be calculated.

The process value is a numerical value based on any or a combination of process amounts such as a temperature, a pressure, a flow rate, a cooling-water temperature, a steam pressure, and a steam temperature of the real object, obtained from a measuring device. Alternatively, the process value may be any environmental value such as an air temperature around the real object or a room temperature. Further, the process value may be a time change rate of the process amount or the environmental value. Because a temperature-distribution range is different depending on the process value in this manner, the determination accuracy is more improved by performing determination in accordance with the process value. The process value is not limited thereto, and a process value that causes a temperature distribution to be varied can be used.

The parameter means a phenomenon that causes a temperature distribution to be varied. Examples of the parameter are seasons such as spring, summer, autumn, and winter. In other examples, the parameters are ranges of a time from startup of an apparatus, for example, 0 to 1 hour, 1 to 6 hours, 6 to 12 hours, 12 hours to 1 day, 1 to 3 days, 0 to 1 week, 1 month, 6 months, and 1 year. Because the temperature-distribution data D14 or D16 is different depending on the parameter as described above, the determination accuracy is more improved by performing determination in accordance with the parameter. The parameter is not limited thereto, and it is possible to use an event that causes a temperature distribution to be varied as the parameter.

The determination module 108 calculates a normal-value range of a temperature for each time change rate of a process value and determines a temperature out of the range of the normal value as being abnormal.

Figure 12:
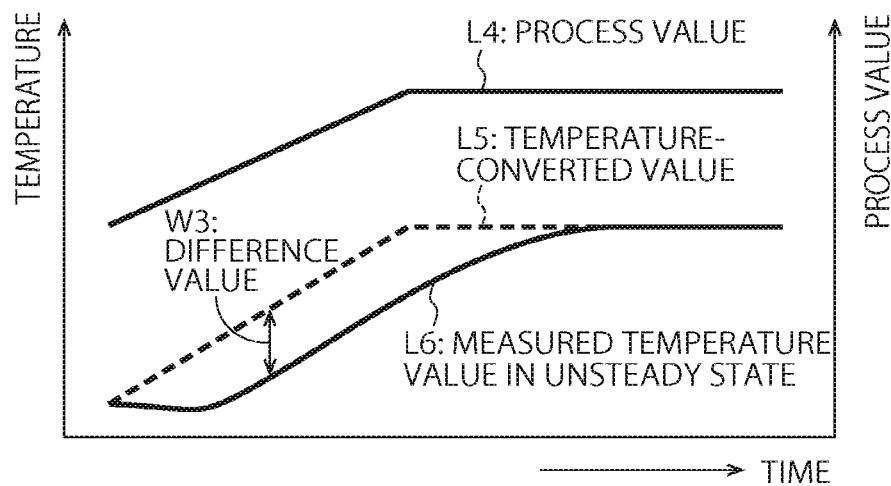
FIG. 12 is a diagram illustrating an example of a temperature change at one coordinate point in an unsteady state.

FIG. 12 is a diagram illustrating an example of a temperature change at one coordinate point in an unsteady state, such as at the time of startup of an apparatus. The horizontal axis represents a time and the vertical axis represents a temperature and a process value. A value obtained by converting a process value L4 into a temperature is a temperature-converted value L5.

Meanwhile, a measured temperature value L6 in an actual unsteady state is deviated from the temperature-converted value L5 by a difference value W3. Therefore, in calculation of a normal-value range of a temperature for each process value L4 as illustrated in FIG. 11, a temperature distribution is distorted, so that the determination accuracy is lowered. Therefore, in the unsteady state, a normal-value range of a temperature for each time change rate of the process value L4 is obtained and is used for determination. The time change rate of the process value L4 in the unsteady state and a time change rate of the measured temperature value L6 in the unsteady state have a higher correlation. Therefore, by calculating the normal-value range of the temperature for each time change rate of a process value, the determination accuracy is improved more.

A process performed by the display processing module 414 is described in detail.

Figure 13:
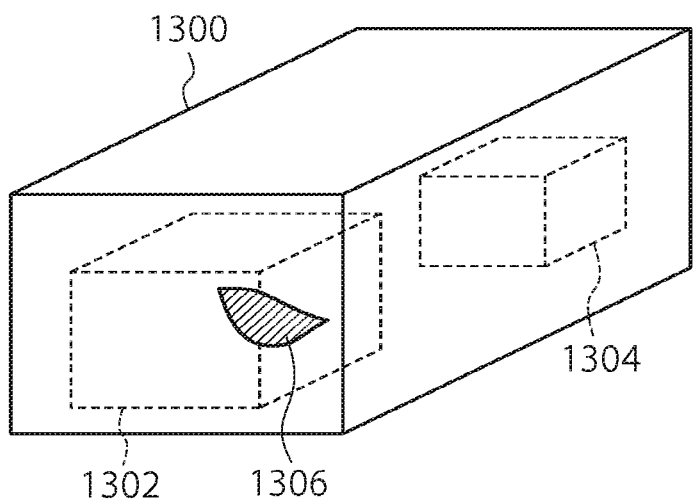
FIG. 13 is a diagram illustrating an image example displayed on a liquid crystal display by a display processing module.

FIG. 13 is a diagram illustrating an image example displayed on the liquid crystal display 412 by the display processing module 414. As illustrated in FIG. 13, the display processing module 414 displays a three-dimensional model 1300, a first internal structure 1302 and a second internal structure 1304 that are internal structure models, and an image 1306 that represents a region where a temperature abnormality has occurred on the liquid crystal display 412 and the display device 30. The three-dimensional model 1300 is, for example, a condenser.

The generation module 104 generates model shape images of the first internal structure 1302 and the second internal structure 1304 that are internal structure models based on information on an internal structure of the three-dimensional model 1300 stored in the memory circuit 102. The display processing module 414 displays an image representing a temperature region 1306 where the temperature abnormality has occurred on a surface of the model shape of the three-dimensional model 1300 together with the model shape images of the three-dimensional model 1300, the first internal structure 1302, and the second internal structure 1304 based on information supplied from the determination module 108.

Accordingly, it is possible to observe the temperature region 1306 where the temperature abnormality has occurred and an internal structure of a real object together. Therefore, an observer can ascertain the cause of the abnormality by also using information on the internal structure. In the example of FIG. 13, for example, the temperature region 1306 where the temperature abnormality has occurred is located on the first internal structure 1302 side. Therefore, it is possible to ascertain that it is highly likely that the cause of the abnormality is present on the first internal structure 1302 side. Meanwhile, in a case of normal infrared thermography, only a relation between a surface of an object and a temperature distribution can be ascertained. Therefore, it is difficult to check a relation with an internal structure on an image.

FIG. 14 is a diagram illustrating an operation mode example of the display processing module 414. As illustrated in FIG. 14, the display processing module 414 enables selection of a combination of a real space image, an abnormal temperature region, a temperature-distribution image, a model shape image, an internal model of a model shape, and an edge image of the model shape, to display the selected combination. For example, the image in FIG. 13 is a result image of the operation example of FIG. 14, and images of the abnormal temperature region, the model shape, and the internal model of the model shape are displayed.

The edge image of the model shape displays a side of the model shape as an edge. The resolution of the temperature-distribution image is low, and it is therefore difficult to ascertain a positional relation with a real object only based on the temperature-distribution image. On the other hand, when the edge image of the model shape and the temperature-distribution image are superimposed on each other, it is possible to easily ascertain the positional relation with the real object.

FIG. 15 is a diagram illustrating another operation mode example of the display processing module 414. As illustrated in FIG. 15, the display processing module 414 is configured to, when an internal model of a model shape (FIG. 14) is selected, enable further selection of an internal model to be displayed. In general, internal structures are arranged in a complicated manner, and there are cases where an internal structure is included in another internal structure. Therefore, when all the internal structures are displayed, it may be difficult to ascertain the internal structures.

Figures 16, 17:
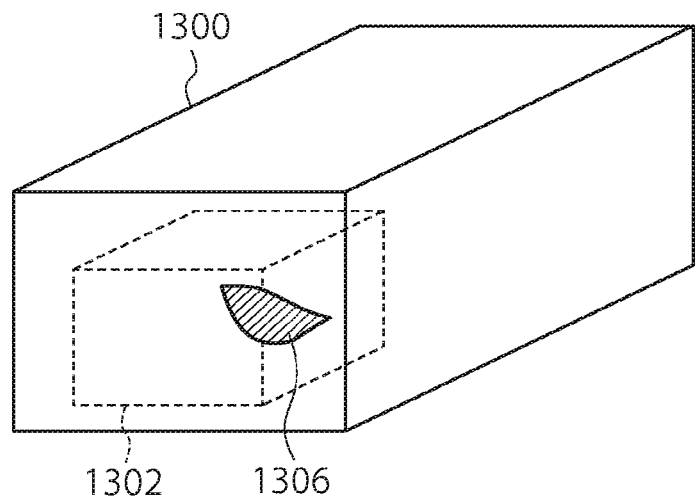
FIG. 16 is a diagram illustrating a display example when a first internal structure is selected as an internal structure.
FIG. 17 is a diagram illustrating another operation mode example of the display processing module, which allows selection of a model.

FIG. 16 is a diagram illustrating a display example when the first internal structure is selected as an internal structure. As illustrated in FIG. 16, by selecting the internal model 1302 to be displayed, it becomes easy to ascertain the internal structure. Because an operation mode according to the present embodiment is configured to enable an internal structure to be checked to be selected in this manner, it becomes easy to ascertain the internal structure.

FIG. 17 is a diagram illustrating another operation mode example of the display processing module 414, which enables selection of a model. As illustrated in FIG. 17, the display processing module 414 is configured to enable a model to be displayed to be selected from a real object located within an image-capturing range of the image-capturing device 402. As illustrated in FIG. 6, a model located within the image-capturing range of the image-capturing device 402 can be ascertained by a three-dimensional model on a model space that crosses the perspective line 110$h$. Accordingly, the display processing module 414 displays attributes of a model that can be displayed, on the liquid crystal display 412. An observer selects any of the attributes of the models displayed on the liquid crystal display 412.

The display processing module 414 only displays a model corresponding to a real object, which is selected by the observer, on the liquid crystal display 412. Accordingly, the observer can intensively observe the model of the real object the observer intends to observe. For example, because display processing related to an internal model illustrated in FIGS. 14 and 15 is also performed for the selected model corresponding to the real object, observation can be performed more easily.

Figure 18:
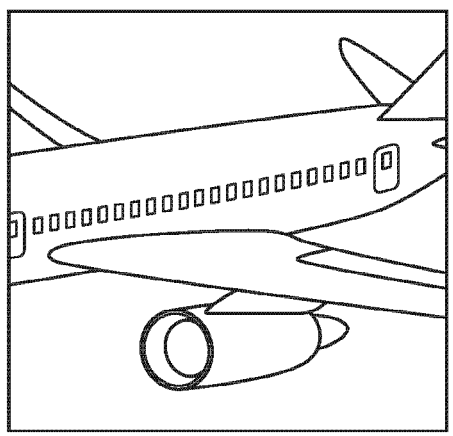
FIG. 18 is a diagram illustrating an example in which the temperature processing apparatus according to the present embodiment is applied to an aircraft.

FIG. 18 is a diagram illustrating an example in which the temperature processing apparatus 1 according to the present embodiment is applied to an aircraft. As illustrated in FIG. 18, the temperature processing apparatus 1 according to the present embodiment can be applied to a device that has three-dimensional design data. Applications examples are an aircraft, an automobile, a train, an electronic device, and a ship.

Figure 19:
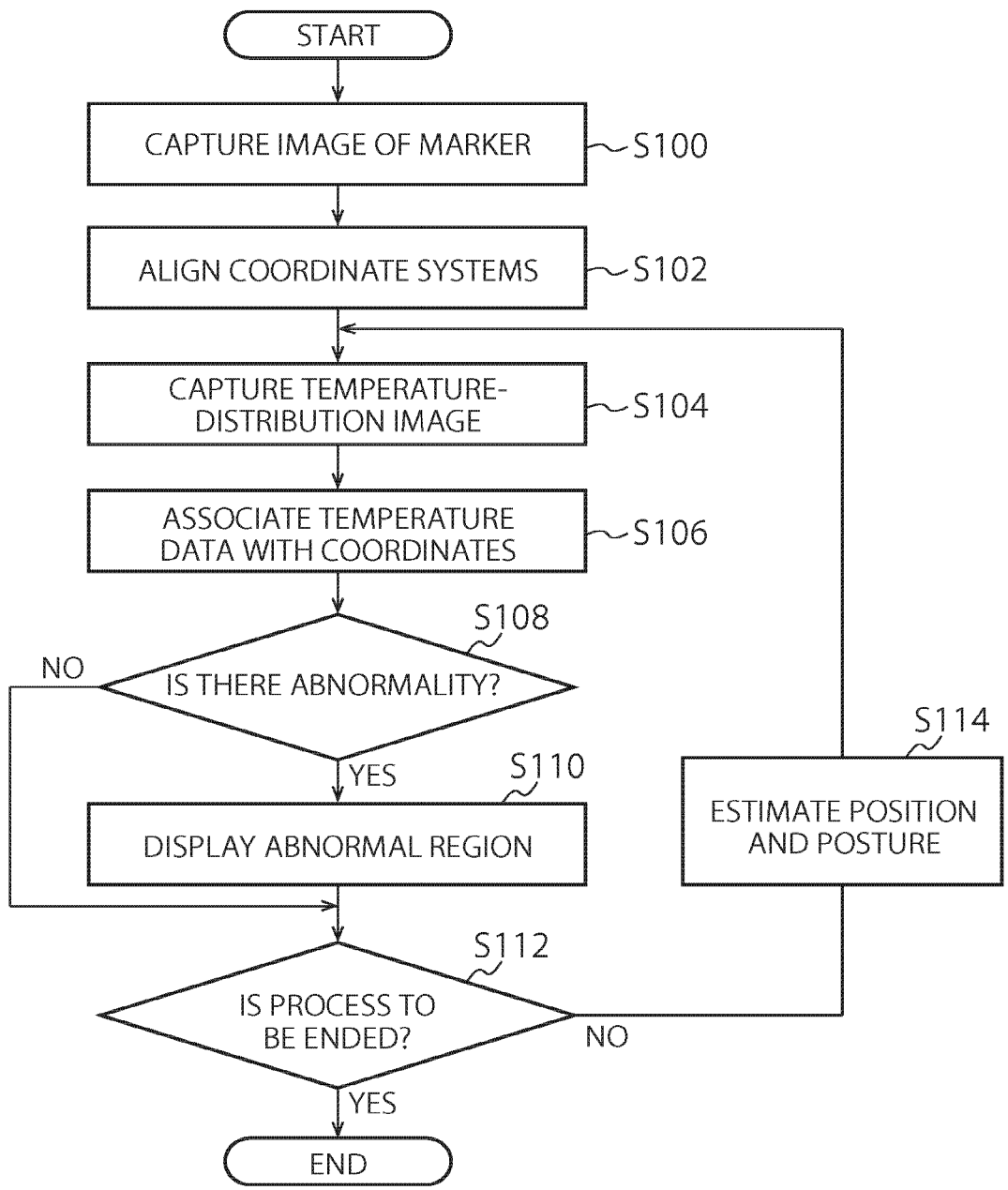
FIG. 19 is a flowchart illustrating a flow of temperature processing in the temperature processing apparatus.

FIG. 19 is an example of a flowchart illustrating a flow of temperature processing in the temperature processing apparatus 1. Here, an example is described in which an abnormal region and a model shape are selected to be displayed in FIG. 14.

As illustrated in FIG. 19, the image-capturing device 402 captures an image of the marker 60 (Step S100). Subsequently, a visible image of the marker 60 acquired by the acquisition module 406 is input to the alignment module 408.

The alignment module 408 aligns the coordinate 110a of a three-dimensional model space in which a three-dimensional model corresponding to a real object is arranged and the coordinate 110c of the image-capturing device 402 with each other based on information on the marker 60 (Step S102).

Next, the image-capturing device 402 captures a temperature-distribution image (Step S104). The temperature-distribution image acquired by the acquisition module 406 is then input to the processing module 410.

Subsequently, the processing module 410 makes temperature data in the temperature-distribution image correspond to three-dimensional coordinates on a surface of the three-dimensional model based on the alignment by the alignment module 408, thereby associating the temperature data with three-dimensional coordinates on a surface of the real object (Step S106).

Next, the determination module 108 determines whether there is an abnormality for every piece of temperature data that are associated with the three-dimensional coordinates (Step S108). If it is determined that there is an abnormality (YES at Step S108), the determination module 108 outputs information on a three-dimensional coordinate at which it is determined that an abnormality is present, to the display processing module 414.

On the basis of information on the three-dimensional coordinate at which it is determined that an abnormality is present, the display processing module 414 displays a three-dimensional model shape and an image representing a region of the three-dimensional coordinate on a surface image of the three-dimensional model shape, at which it is determined that an abnormality is present, on the liquid crystal display 412 (Step S110). Meanwhile, if there is no abnormality (NO at Step S108), processes from Step S112 are performed.

Next, the control module 416 determines whether an overall process is to be ended (Step S112). If the control module 416 determines that the overall process is to be ended (YES at Step S112), the control module 416 ends the overall process. Meanwhile, if the overall process is not to be ended (NO at Step S112), the alignment module 408 estimates the position and the posture of the head-mounted video device 40 (Step S114) and repeats the processes from Step S104.

In this manner, in a case where there is an abnormality in temperature data, a region including the abnormality is displayed on a three-dimensional model corresponding to a real object that is being observed. Because of this display, the spot of the abnormality can be easily determined.

As described above, according to the present embodiment, the alignment module 408 aligns a coordinate of a three-dimensional model space in which a three-dimensional model corresponding to a real object is arranged and a coordinate of the image-capturing device 402 with each other, and the processing module 410 associates temperature data in a temperature-distribution image with coordinates of the three-dimensional model that corresponds to a surface of the real object based on this alignment. Accordingly, it is possible to associate temperature data in temperature-distribution images captured from different positions with common coordinates that correspond to a surface of a real object via the three-dimensional model.

At least a part of the data processing method in the temperature processing apparatus 1 according to the above embodiments may be formed of hardware or software. In the case of software, a program realizing at least a partial function of the data processing method may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc. Further, a program realizing at least a partial function of the data processing method can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A temperature processing apparatus, comprising:
   a storage device configured to store therein a temperature processing program; and
   a processor configured to perform temperature processing in accordance with the temperature processing program including
   an alignment module configured to align is arranged and a three-dimensional model space in which a three-dimensional model of a real object is captured by the image-capturing module,
   an acquisition module configured to acquire temperature-distribution images captured by the image-capturing module from a plurality of different positions and a real-space image,
   a processing module configured to associate temperature data in the temperature-distribution images with coordinates corresponding to a surface of the three-dimensional model, wherein the temperature data associated with the coordinates is stored in the storage device,
   a determination module configured to determine whether the temperature data fits in a first state, and
   a display processing module configured to display a temperature-distribution image of the temperature data fitting the first state on a display module by mapping the temperature-distribution image of the temperature data fitting the first state on at least either the real-space image or an image of the three-dimensional model, when the determination module determines that the temperature data fits the first state.

2. The apparatus of claim 1, wherein
the real object is included in a plant, and
the storage device stores the temperature data associated with at least process data that represents an operation state of the plant or a time.

3. The apparatus of claim 1, wherein the determination module determine whether the temperature data fits the first state in accordance with process data that represents an operation state of the real object.

4. A temperature processing apparatus comprising:
a storage device configured to store therein a temperature processing program; and
a processor configured to perform temperature processing in accordance with the temperature processing program including
an alignment module configured to align a real space in which an image-capturing module is arranged and a three-dimensional model space of a three-dimensional model of a real object,
an acquisition module configured to acquire temperature-distribution images captured by the image-capturing module from a plurality of different positions,
a processing module configured to associate temperature data in the temperature-distribution images with the coordinates of the three-dimensional model space based on the alignment by the alignment module, wherein the temperature data associated with the coordinates is stored in the storage device,
a determination module configured to determine whether the temperature data associated with the coordinates fits a first state, and
a display processing module configured to display a temperature-distribution image of the temperature data fitting the first state on a display module by mapping the temperature-distribution image of the temperature data fitting the first state on at least a surface image of the three-dimensional model corresponding to the temperature-distribution image and an internal-module image, or by mapping the temperature-distribution image of the temperature data fitting the first state on an edge image of the three-dimensional model corresponding to the temperature-distribution image, when the determination module determines that the temperature data fits the first state.

5. The apparatus of claim 4, wherein the display processing module displays models having inner module shapes in the three-dimensional model in such a manner that any of the models is selected.

6. The apparatus of claim 4, wherein the display processing module displays the three-dimensional model in such a manner that the three-dimensional model is selected.

7. The apparatus of claim 1, further comprising a goggle-type head-module mounting device with the display module provided therein.

8. A temperature processing method comprising:
aligning is arranged and a three-dimensional model space in which a three-dimensional model of a real object is captured by the image-capturing module;
acquiring temperature-distribution images in a real space that are captured by the image-capturing module from a plurality of different positions and a real-space image;
associating temperature data in the temperature-distribution images with coordinates corresponding to a surface of the three-dimension model;
storing the temperature data associated with the three-dimensional coordinate; and
determining whether the temperature data associated with the three-dimensional coordinate fits a first state.

9. The method of claim 8, wherein
the real object is included in a plant, and
in the storing, the temperature data associated with at least process data that represents an operation state of the plant or a time.

10. The method of claim 8, wherein the determining is performed in accordance with process data that represents an operation state of the real object.

11. The method of claim 8, wherein, when the temperature data fits the first state in the determining, a temperature-distribution image of the temperature data is displayed on a display module by mapping the temperature-distribution image of the temperature data fitting the first state on at least together with a surface image of the three-dimensional model corresponding to the temperature-distribution image and an internal-module image.

12. The method of claim 8, wherein, when the temperature data fits the first state in the determining, a temperature-distribution image of the temperature data is displayed on a display module by mapping the temperature-distribution image of the temperature data fitting the first state on an edge image of the three-dimensional model corresponding to the temperature-distribution image.

13. The method of claim 11, wherein the display processing module displays models having inner module shapes in the three-dimensional model in such a manner that any of the models is selected.

14. The method of claim 11, wherein the display processing module displays the three-dimensional model in such a manner that the three-dimensional model is selected.

* * * * *